US010901224B2

(12) United States Patent
Ku et al.

(10) Patent No.: US 10,901,224 B2
(45) Date of Patent: Jan. 26, 2021

(54) NECK MOUNTED COMPUTING DEVICE WITH DISPLAY CONNECTIVITY

(71) Applicant: Intel Corporation, Santa Clara, CA (US)

(72) Inventors: Jeff Ku, Taipei (TW); Gavin Sung, Taipei (TW); Simon S. Yuan, Taipei (TW); Lance Lin, Taipei (TW); Jason Y Jiang, Taipei (TW)

(73) Assignee: Intel Corporation, Santa Clara, CA (US)

(*) Notice: Subject to any disclaimer, the term of this patent is extended or adjusted under 35 U.S.C. 154(b) by 448 days.

(21) Appl. No.: 15/582,000

(22) Filed: Apr. 28, 2017

(65) Prior Publication Data
US 2018/0314068 A1 Nov. 1, 2018

(51) Int. Cl.
*G02B 27/01* (2006.01)

(52) U.S. Cl.
CPC .. *G02B 27/0176* (2013.01); *G02B 2027/0138* (2013.01); *G02B 2027/0156* (2013.01); *G02B 2027/0159* (2013.01); *G02B 2027/0165* (2013.01)

(58) Field of Classification Search
CPC .................................................. G02B 27/0176
USPC ........................................................ 359/632
See application file for complete search history.

(56) References Cited

U.S. PATENT DOCUMENTS

| 4,952,024 A * | 8/1990 | Gale | A61L 9/122 348/53 |
| 5,682,172 A * | 10/1997 | Travers | A42B 3/042 345/8 |
| 5,701,356 A * | 12/1997 | Stanford | H04R 5/023 381/370 |
| 6,140,981 A * | 10/2000 | Kuenster | G06F 1/163 345/7 |
| 6,421,031 B1 * | 7/2002 | Ronzani | G02B 27/017 345/8 |
| 6,707,924 B1 * | 3/2004 | Okiebisu | A45F 5/00 181/128 |
| 6,920,228 B2 * | 7/2005 | Redmer | H04R 1/1058 381/370 |
| 7,428,429 B2 * | 9/2008 | Gantz | H04M 1/05 455/344 |
| 8,237,626 B2 * | 8/2012 | Ishino | G02B 27/017 345/8 |
| 9,042,948 B2 * | 5/2015 | Serota | G02B 27/017 345/8 |
| 9,858,030 B2 * | 1/2018 | Serota | G06F 3/1446 |

(Continued)

FOREIGN PATENT DOCUMENTS

WO WO-2013098376 A1 * 7/2013 ......... G02B 27/0176

*Primary Examiner* — James R Greece
(74) *Attorney, Agent, or Firm* — Schwegman Lundberg & Woessner, P.A.

(57) ABSTRACT

A wearable computing device having a main computing element having a center portion and at least two arms and a display element operably connected to arms to enclose a region within which a body part may be inserted. Each arm may include a docking element connectable to the display element and may be configured to slide within the arm to move the display element relative to the center portion of the main computing element. A pivot arm may pivotably connect the display element to the slider arm to permit pivoting of the display element relative to the plane of the main computing element.

24 Claims, 6 Drawing Sheets

(56) References Cited

U.S. PATENT DOCUMENTS

| | | | | |
|---|---|---|---|---|
| 2003/0115661 A1* | 6/2003 | Dobbie | .................. | A42B 1/046 |
| | | | | 2/422 |
| 2004/0004582 A1* | 1/2004 | Patterson | ........... | G02B 27/0176 |
| | | | | 345/7 |
| 2004/0180631 A1* | 9/2004 | Lim | ....................... | H04B 1/385 |
| | | | | 455/90.3 |
| 2006/0092374 A1* | 5/2006 | Ishak | ....................... | G02C 7/12 |
| | | | | 351/159.57 |
| 2007/0248238 A1* | 10/2007 | Abreu | .................... | G02C 3/003 |
| | | | | 381/381 |
| 2015/0234189 A1* | 8/2015 | Lyons | ................ | G02B 27/0172 |
| | | | | 345/174 |
| 2015/0331260 A1* | 11/2015 | Chen | ....................... | G02C 7/14 |
| | | | | 348/122 |

\* cited by examiner

NECK MOUNTED COMPUTING DEVICE WITH DISPLAY CONNECTIVITY

TECHNICAL FIELD

This document pertains generally, but not by way of limitation, to a wearable computing element having a display element positioned proximate to a user's face.

BACKGROUND

Virtual reality ("VR") and augmented reality ("AR") devices typically comprise a display or projection screen attached to a user's head with straps or webbing to position the display or projection screen proximate the user's eyes. The display or projection screen are commonly configured in a goggle configuration where the computing, projection, and other systems are positioned proximate the display or projection screen. In this configuration, the VR and AR devices may be provided as a single assembly with straps and webbing extending from the assembly to loop around the user's head. The drawback of this configuration is the weight of the VR and AR devices moves the center of mass of the user's head forward placing considerable strain on the user's neck making the VR and AR devices uncomfortable to wear for extended periods of time.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, that a problem to be solved may include supporting the weight of virtual reality or augmented reality systems to avoid user fatigue. In an example, the present subject matter may provide a solution to this problem, such as by a wearable computing device having a main computing element having a center portion and at least two arms and a display element operably connected to arms to enclose a region within which a body part may be inserted. Each arm may inch de a docking element connectable to the display element and configured to slide within the arm to move the display element relative to the center portion of the main computing element. Each slider element may also include a pivot arm that may be pivotably connected to the display element to pivot the display element relative to the plane of the main computing element.

This overview is intended to provide an overview of subject matter of the present patent application. It is not intended to provide an exclusive or exhaustive explanation of the present subject matter. The detailed description is included to provide further information about the present patent application.

Figure 1:
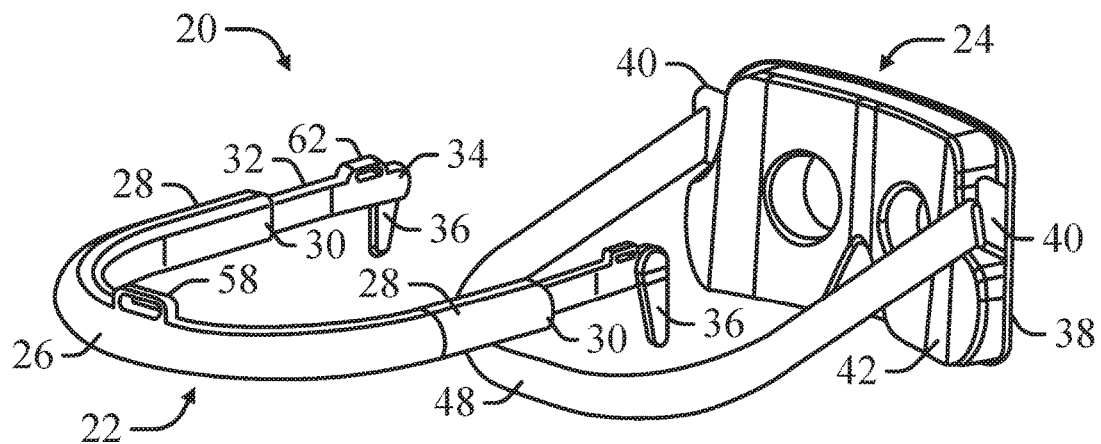
FIG. 1 is an exploded perspective view of a wearable computing device configured for virtual reality viewing according to an example of the present disclosure.
Figure 2:
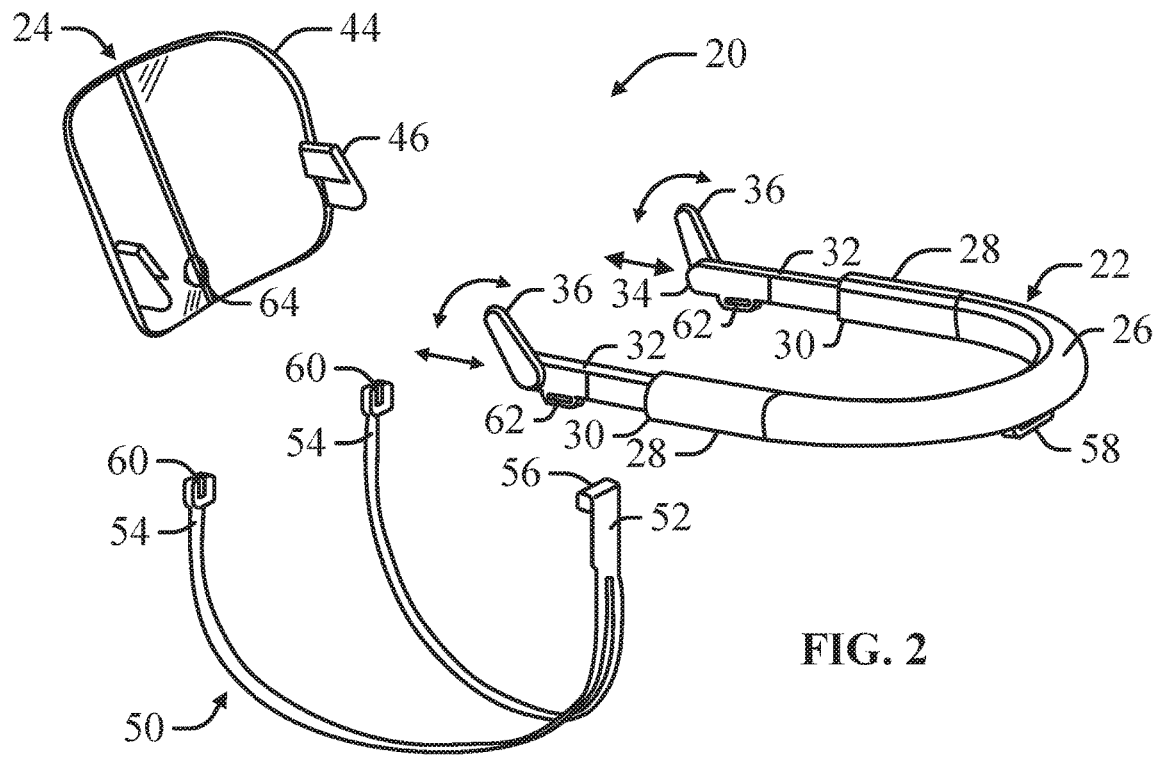
FIG. 2 is an exploded perspective view of a wearable computing device configured for augmented reality viewing according to an example of the present disclosure.

As depicted in FIGS. 1 and 2, a wearable computing device 20, according to an example of the present disclosure, may include a main computing element 22 and a display element 24 connectable to the main computing element 22. The main computing element 22 is shaped to be hung or supported on a user's body part (e.g. forehead, neck) to support the weight of the wearable computing device 20 and position the display element 24 proximate the user's face for viewing as illustrated in FIGS. 5A-C. The display element 24 may be configured for virtual reality ("VR") as illustrated in FIG. 1 or augmented reality ("AR") as illustrated in FIG. 2. The display element 24 may be configured for VR operation or AR operation to convert the wearable computing device 20 for different viewing functions. In an example, the main computing element 22 may be repositioned on different parts of the user's body to change the orientation of the display element 24 relative to the user's eyes.

As depicted in FIGS. 1 and 2, in an example, the main computing element 22 includes a center portion 26 and at least two arms 28 extending outward from the center portion 26 to an outer end 30. The center portion 26 and the at least two arms 28 are arranged in a plane to define a partially enclosed region between the center portion 26 and the at least two arms 28, wherein a user's body part is receivable within the partially enclosed region. As illustrated in FIGS. 1 and 2, the center portion 26 and the at least two arms 28 are arranged in a U-shape, wherein the main computing element 22 may be positioned on a user's body part such that a portion of the body part is received in the center of the U.

The main computing element 22 may include a slider element 32 slideably received within each arm 28. The slider element 32 may be slid within the arm 28 as illustrated in FIG. 2 to change the length of the docking end 34 of the slider element 32 that projects from the outer end 30 of the arm 28. In an example, each slider element 32 may further include a pivot arm 36 pivotably mounted to the slider element 32 at the docking end 34. The pivot arm 36 may be pivoted relative to the slider element 32 and corresponding to the region defined by the main computing element 22 as illustrated in FIG. 2.

As depicted in FIG. 1, the display element 24 may be configured in a VR configuration. In this configuration, the display element 24 may comprise a display screen 38 on which at least one image may be displayed. The display screen 38 may include at least one mounting bracket 40 that may be coupled to the pivot arm 36 to fully enclose the region defined by the main computing element 22. The slider element 32 may be slid within the arm 28 to alter the relative distance between the display element 24 and the center portion 26 to resize the enclosed region to correspond to different body parts of the user. The pivot arms 36 may be pivoted to pivot the display screen 38 relative to the main computing element 22. In an example, the display element 24 may include a face mask 42 having two eye holes through which the display screen 38 is visible and configured to engage a user's face and align the user's face with the eye holes.

As depicted in FIG. 2, the display element 24 may be configured in an AR configuration. In this configuration, the display element 24 may comprise a semi-transparent screen 44 on which at least one image may be displayed. A user may view the surrounding environment through the semi-transparent screen 44, wherein the displayed image appears superimposed on the surrounding environment. The semi-transparent screen 44 may include at least one mounting bracket 46 that may be coupled to the pivot arm 36 to fully enclose the region defined by the main computing element 22. The slider element 32 may be slid within the arm 28 to alter the relative distance between the display element 24 and the center portion 26 to resize the enclosed region to correspond to different body parts of the user. The pivot arms 36 may be pivoted to pivot the semi-transparent screen 44 relative to the main computing element 22. In an example, the semi-transparent screen 44 may be pivoted such that the semi-transparent screen 44 is positioned out of the line of sight of the user's vision and/or angled away from the user's face to minimize fogging from the user's breath. An anti-fogging coating may be applied to the semi-transparent screen 44 to minimize fogging from the user's breath.

As depicted in FIG. 1, in an example, the wearable computing device 20 may include a head strap 48 extending from one side of the display element 24 to the opposing side of the display element 24 to form a loop. The loop of the head strap 48 may be looped around a portion of the user's head or neck to support the wearable computing device 20. In an example, the head strap 48 may be coupled to the bracket 40, 46 of the display element 24 such that the head strap 48 may be attached the display element 24 proximate the temples of the user. In this position, the head strap 48 may be looped under the base of the user's skull to prevent the display element 24 from tipping forward from the user's face.

Figure 3:
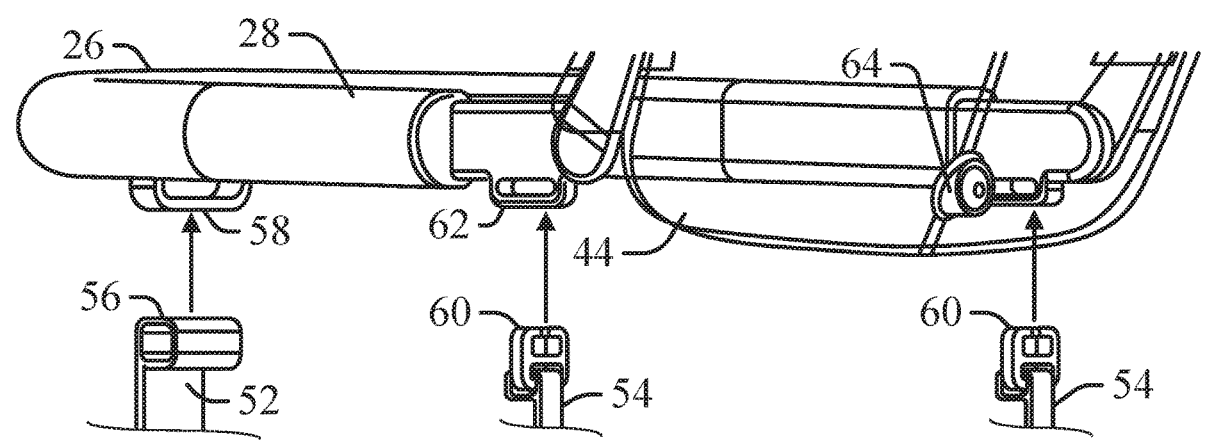
FIG. 3 is a partial perspective view of a wearable computing device configured for augmented reality viewing illustrating coupling of a back strap to the wearable computing device.

As depicted in FIGS. 2 and 3, in an example, the wearable computing device 20 may include a back strap 50 having a center end 52 and slider ends 54. The back strap 50 may include a center clip 56 that may be engaged to a center bracket 58 on the center portion 26 of the main computing element 22. The back strap 50 may include a slider clip 60 that may be engaged to a slider bracket 62 on a corresponding slider element 32. The back strap 50 may be sized such that the back strap 50 may extend from the center portion 26 and underneath the user's arm to the slider element 32.

Figure 4A:
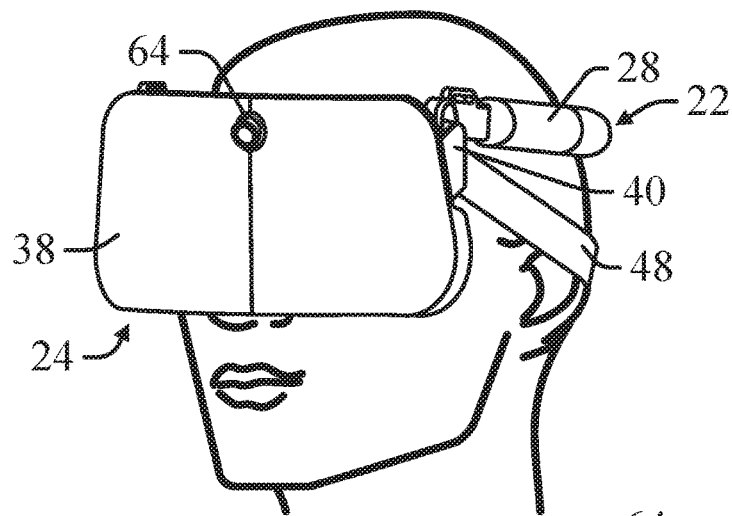
FIG. 4A is a schematic view of a wearable computing device configured for virtual reality viewing positioned on a user's forehead according to an example of the present disclosure.
Figure 4B:
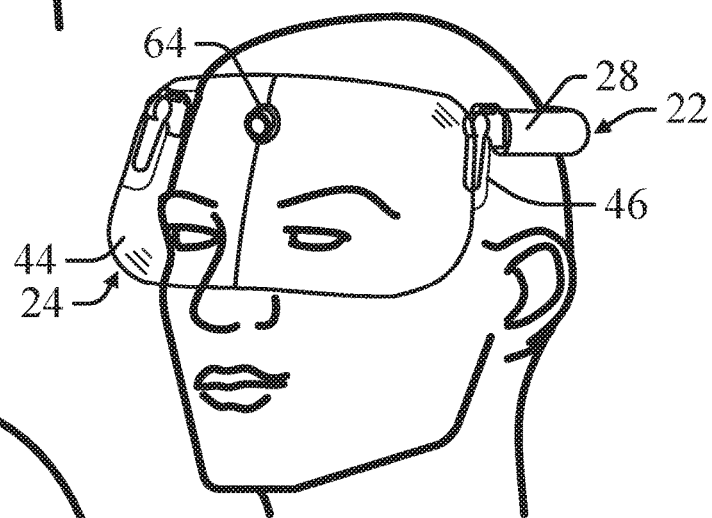
FIG. 4B is a schematic view of a wearable computing device configured for augmented reality viewing positioned on a user's forehead according to an example of the present disclosure.
Figure 5:
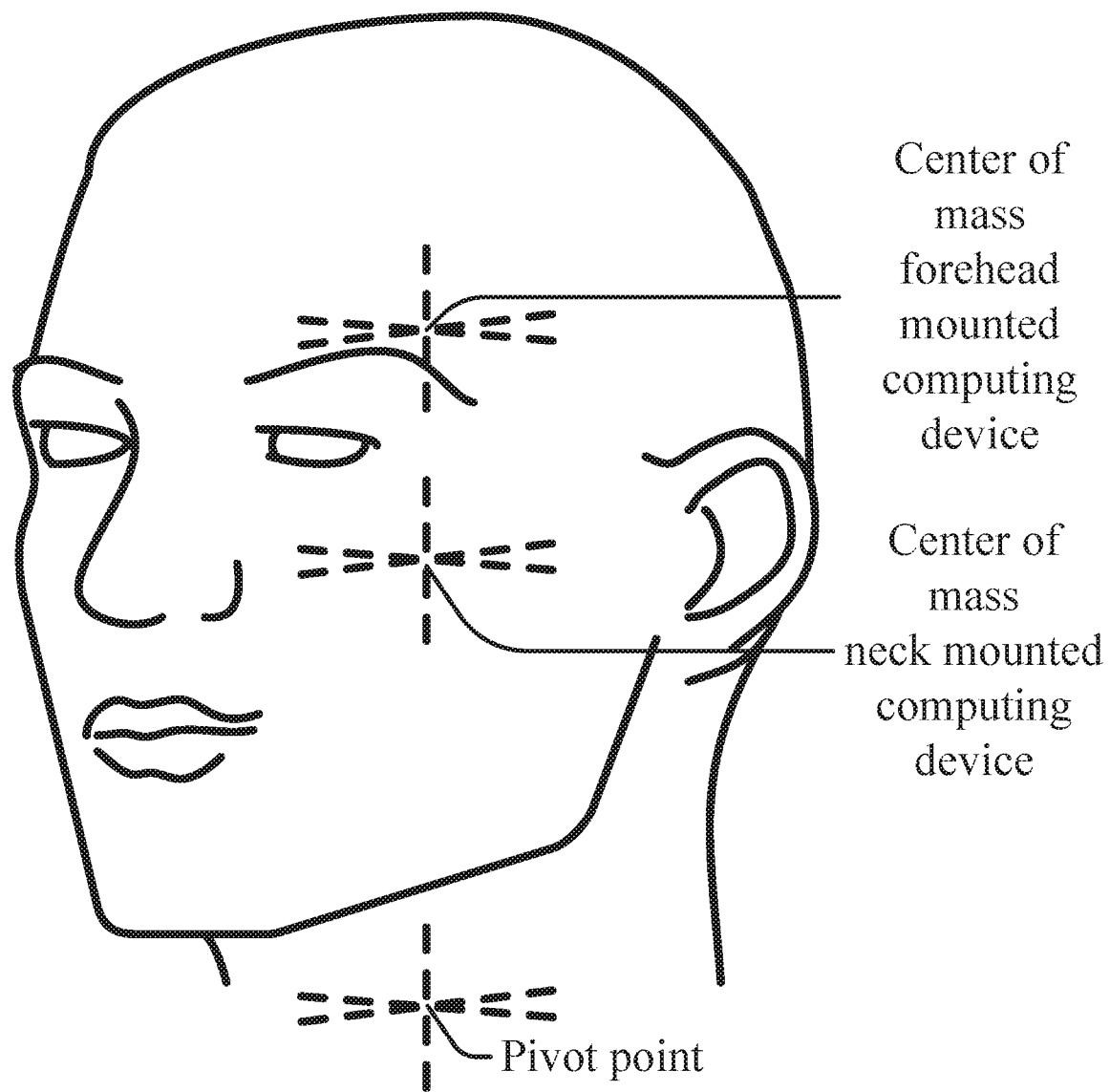
FIG. 5 is a schematic view of a user's head illustrating the change in the center of mass from the positioning of the wearable computing device according to an example of the present disclosure.

As illustrated in FIGS. 4A and 4B, in an example, the slider elements 32 of the main computing element 22 may be slid to move the display element 24 relative to the center portion 26 of the main computing element 22 to size the enclosed region to correspond to the forehead of a user. In this configuration, the brackets 40, 46 of the display element 24 may be positioned proximate to the user's temples such that the display element 24 extends downward over the user's eyes. As illustrated in FIG. 5, in this position, the weight of the wearable computing device 20 elevates the center of mass of the user's head. In an example, the head strap 48 may extend around the base of the user's skull to cooperate with the main computing element 22 to stabilize the wearable computing device 20 on the user's head.

Figure 4C:
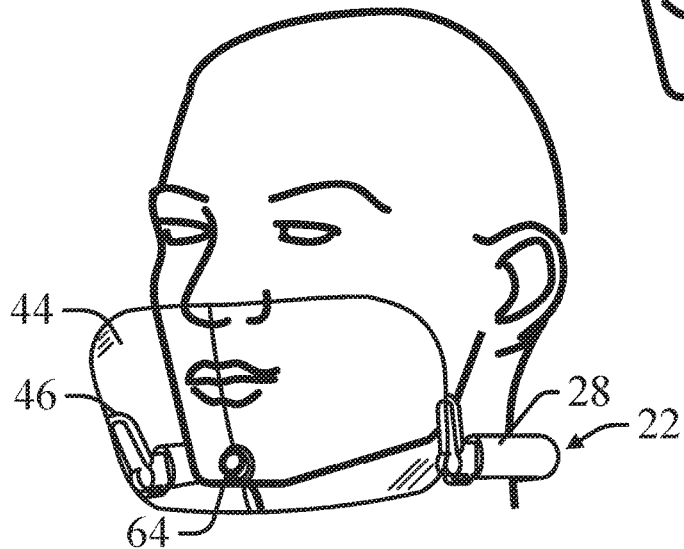
FIG. 4C is a schematic view of a wearable computing device configured for augmented reality viewing positioned on a user's forehead according to an example of the present disclosure.

As illustrated in FIG. 4C, in an example, the slider elements 32 of the main computing element 22 may be slid to move the display element 24 relative to the center portion 26 of the main computing element 22 to size the enclosed region to correspond to the neck of a user. In this configuration, the display element 24 extends upward toward the user's eyes. The display element 24 may be configured in an AR configuration and positioned such that the semi-transparent screen 44 is viewable by the user looking downward. As illustrated in FIG. 5, in this position, the weight of the wearable computing device 20 maintains the center of mass of the user's head proximate the normal position as the weight of the wearable computing device 20 is positioned proximate the neck of the user's head. The neck mounted wearable computing device 20 positions the weight of the wearable computing device 20 on the shoulders of the user making the wearable computing device 20 more comfortable to wear for longer periods of time. In this position, the semi-transparent screen 44 is positioned below the user's vision when the user is looking straight forward. In an example, the pivot arms 36 may be pivoted such that the semi-transparent screen 44 is oriented away from the user's face to improve air circulation and reducing fogging of the transparent screen 44.

As depicted in FIGS. 2-4C, in an example, the display element 24 may include a forward camera 64. The forward camera 64 may collect additional information that may be used to modify the images displayed by the display element 24. In the VR configuration, the forward camera 64 may capture real-time images, which are displayed by on the display screen 38. In an example, additional images may be overlaid over the real-time images to simulate AR visuals.

Figure 6A:
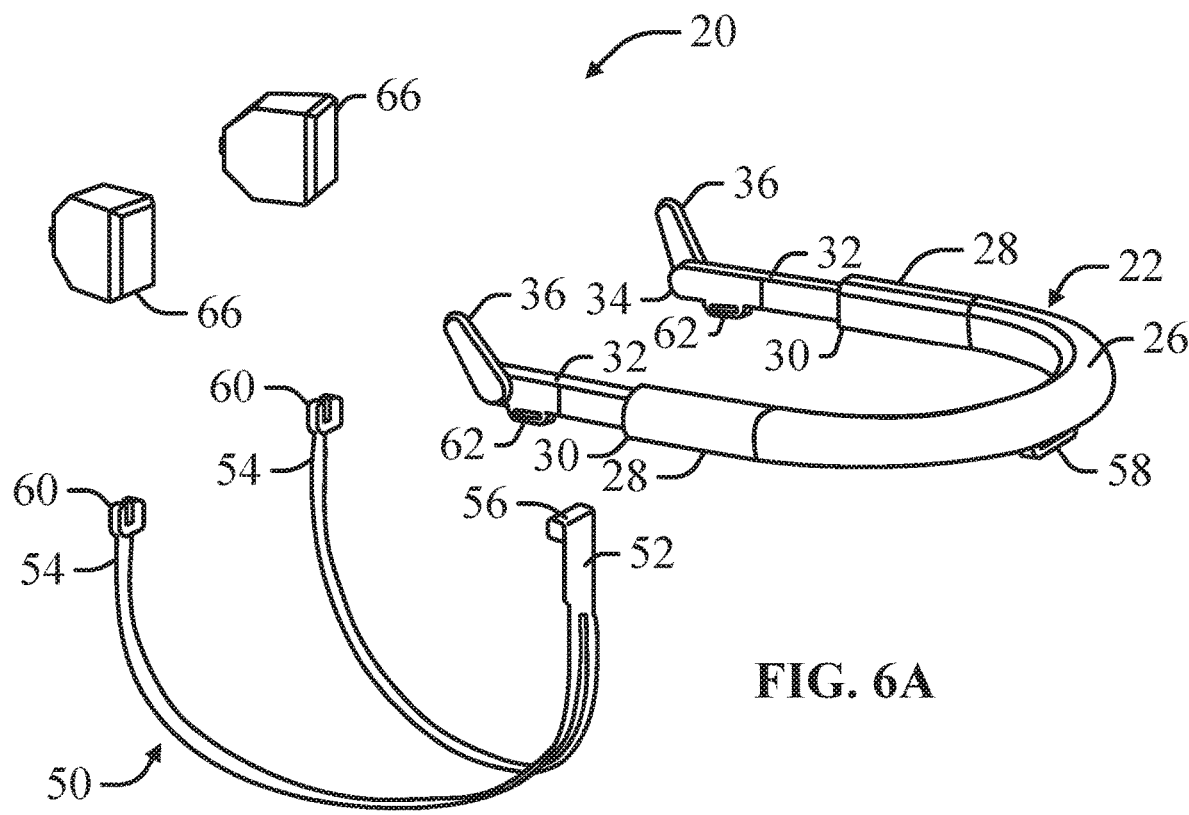
FIG. 6A is an exploded perspective view of a wearable computing device having action cameras viewing according to an example of the present disclosure.
Figure 6B:
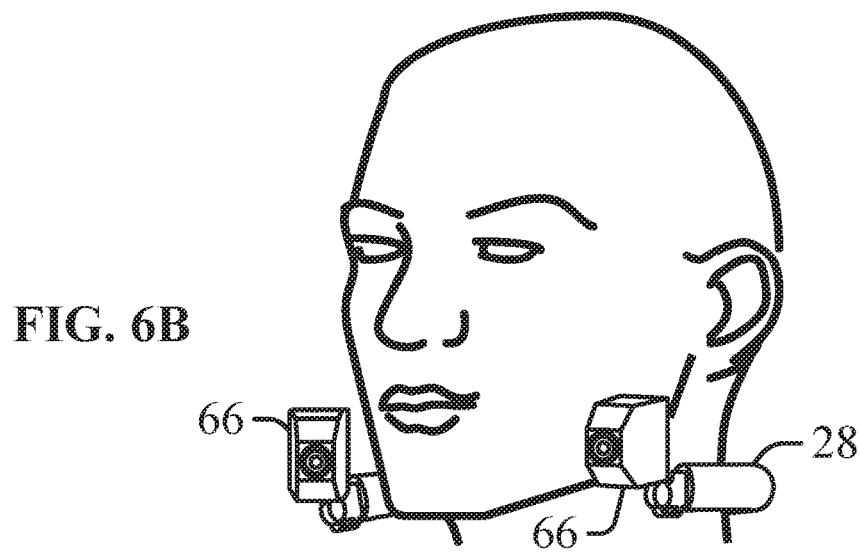
FIG. 6B is a schematic view of a wearable computing device having action cameras according to an example of the present disclosure.

As depicted in FIGS. 6A-B, in an example, the wearable computing device 20 may include at least one action camera 66 mountable onto the pivot arm 36. The action camera 66 may be rotated within a plane transverse on the pivot arm 36 to alter the orientation of the action camera 66. The pivot arm 36 may be rotated relative to the slider element 32 to pivot the action camera 66 relative to the main computing element 22.

Figure 7A:
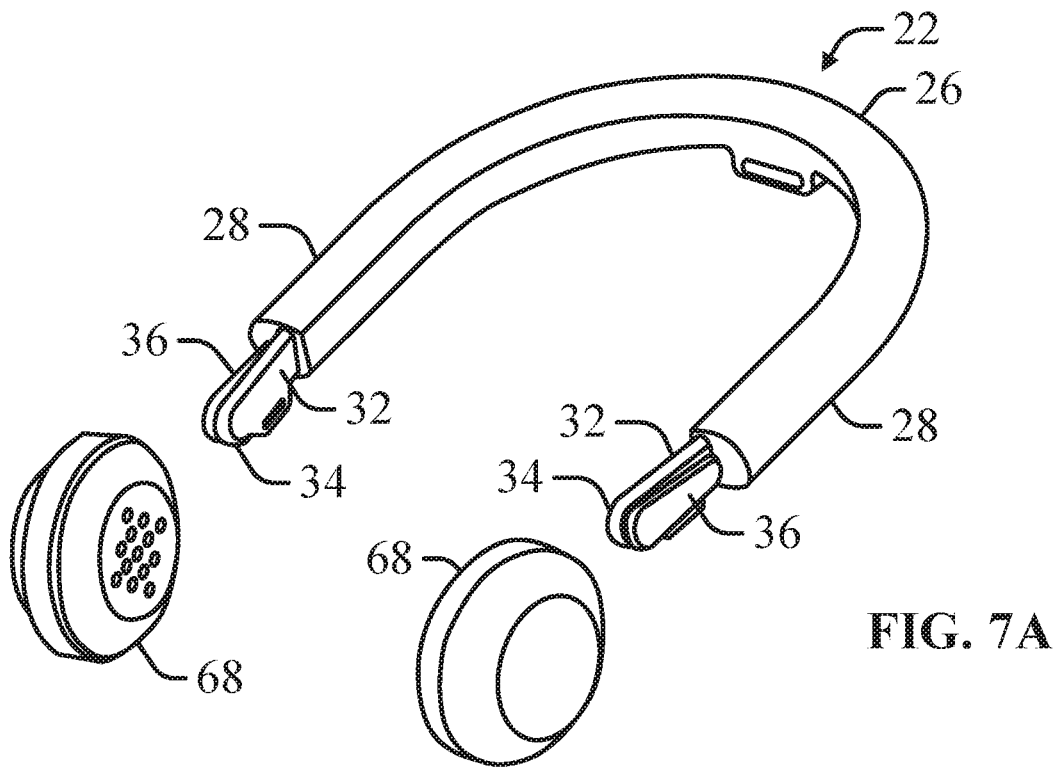
FIG. 7A is an exploded perspective view of a wearable computing device having speakers viewing according to an example of the present disclosure.
Figure 7B:
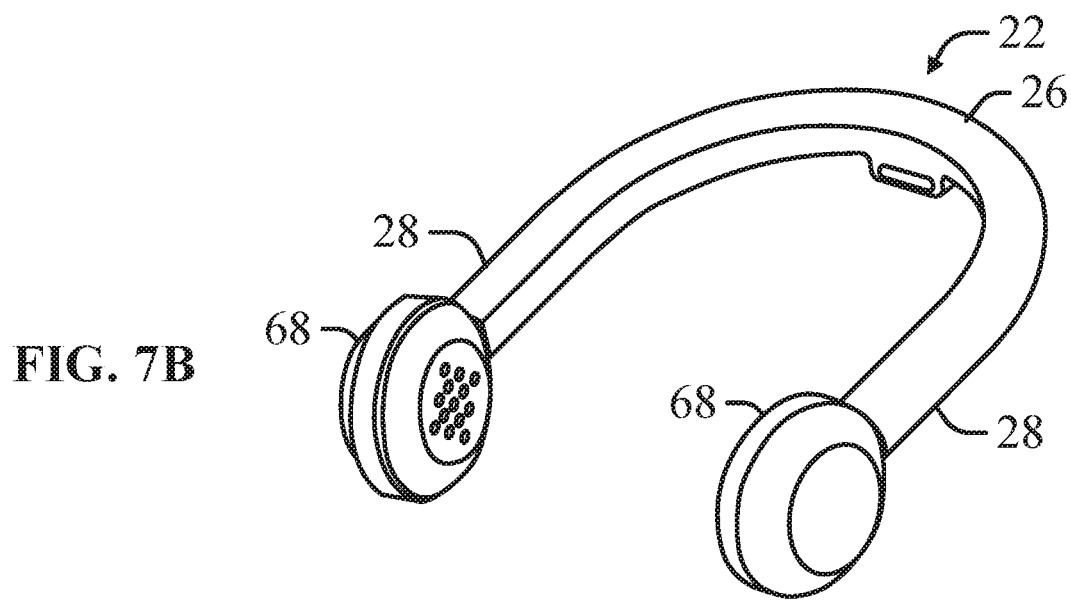
FIG. 7B is a schematic view of a wearable computing device having speakers according to an example of the present disclosure.

As depicted in FIGS. 7A-B, in an example, the wearable computing device 20 may include at least one speaker 68 mountable onto the docking end 34 of the slider element 32. As illustrated in FIG. 7A, the pivot arm 36 may be folded flush with the docking end 34 of the speaker 68 and receivable within a slot (not shown) of the speaker 68 to mount speaker 68 onto the main computing element 22. In this configuration, the wearable computing device 20 may be used as a conventional headphones or behind-the-ears headphones.

VARIOUS NOTES & EXAMPLES

Example 1 is a wearable computing device, comprising: a main computing element having a center portion and at least two arms extending outward from the center portion within a plane, wherein each arm has an outer end opposite the center portion; and a display element operably connected to the outer ends of the at least two arms to enclose a closed region within the plane between the center portion, the at least two arms, and the display element.

In Example 2, the subject matter of Example 1 optionally includes wherein the at least two arms extend outward from the center portion such that the main computing element is configured in a U-shape.

In Example 3, the subject matter of any one or more of Examples 1-2 optionally include wherein each arm further comprises: a slider element having a docking end connectable to the display element; wherein the slider element is moveable between a retracted position within the arm and an extended position in which the slider element extends outward from the outer end of the arm to move the display element relative to the center portion.

In Example 4, the subject matter of Example 3 optionally includes wherein each slider element further comprises: a pivot arm pivotably connected to the docking end of the slider; wherein the display element is connectable to the pivot arm whereby pivoting the pivot arm on the slider arm pivots the display element relative to the plane defined by the main computing element.

In Example 5, the subject matter of Example 4 optionally includes wherein the display element is pivoted such that display element is oriented transverse to the plane defined by the main computing element.

In Example 6, the subject matter of any one or more of Examples 3-5 optionally include wherein the slider element further comprises: an action camera mountable to the pivot arm.

In Example 7, the subject matter of any one or more of Examples 3-6 optionally include at least one back strap having a slider end and a center end; wherein the slider end is attachable to the slider element at the docking end and the center end is attachable to the center portion of the main computing element to form an arm loop.

In Example 8, the subject matter of Example 7 optionally includes at least two back straps, each back strap extending from the center end to one of the at least two slider elements to form at least two arm loops.

In Example 9, the subject matter of any one or more of Examples 7-8 optionally include wherein the slider further comprises a slider bracket at the docking end of the slider; wherein the back strap further comprises a slider clip positioned at the slider end and configured to be coupled to the slider bracket.

In Example 10, the subject matter of any one or more of Examples 7-9 optionally include wherein the center portion of the main computing element further comprises a center bracket; wherein the back strap further comprises a center clip positioned at the center end and configured to be coupled to the center bracket.

In Example 11, the subject matter of any one or more of Examples 1-10 optionally include a speaker mountable to the pivot arm.

In Example 12, the subject matter of any one or more of Examples 1-11 optionally include an angled head strap having two ends, each end configured to be attach to opposing sides of the display element to form a head loop oriented generally angled to the plane of the main computing element.

In Example 13, the subject matter of Example 12 optionally includes wherein the ends of the angled head strap are mounted to the opposing sides of the display element proximate to the outer ends of the arms of the main computing element.

In Example 14, the subject matter of any one or more of Examples 1-13 optionally include wherein the display element comprises a semi-transparent screen.

In Example 15, the subject matter of Example 14 optionally includes wherein the closed region is sized to fit around a forehead of a user's forehead.

In Example 16, the subject matter of Example 15 optionally includes wherein the display element is coupled to the main computing element such that a bottom edge of the semi-transparent screen is aligned with a center horizontal axis of the user's vision.

In Example 17, the subject matter of any one or more of Examples 15-16 optionally include wherein the display element is coupled to the main computing element such that the semi-transparent screen is centered on a center horizontal axis of the user's vision.

In Example 18, the subject matter of any one or more of Examples 14-17 optionally include wherein the closed region is sized to fit around a user's neck; wherein the display element is coupled to the main computing element such that a top edge of the semi-transparent screen is aligned with a center horizontal axis of the user's vision.

In Example 19, the subject matter of any one or more of Examples 14-18 optionally include wherein the display element is mounted to the main computing element proximate to one of a top edge and a bottom edge of the semi-transparent screen.

In Example 20, the subject matter of any one or more of Examples 14-19 optionally include wherein the semi-transparent screen comprises a liquid repellant coating.

In Example 21, the subject matter of any one or more of Examples 14-20 optionally include wherein at least one image is projected onto the semi-transparent screen.

In Example 22, the subject matter of Example 21 optionally includes wherein a display screen is mounted to the semi-transparent screen for projection of the at least one image onto the semi-transparent screen.

In Example 23, the subject matter of Example 22 optionally includes wherein the display screen is interchangeably mounted to the main computing element.

In Example 24, the subject matter of any one or more of Examples 22-23 optionally include wherein the semi-transparent screen further comprises a face mask positionable against a user's face.

In Example 25, the subject matter of Example 24 optionally includes wherein the face mask defines two eye holes.

Example 26 is a method for providing an image for a user with a wearable computing device, comprising: providing a main computing element having a center portion and at least two arms extending outward from the center portion within a plane such that the main computing element can partially encircle a body part of the user's body, wherein each arm has an outer end opposite the center portion; and coupling a display element to the outer ends of the at least two arms to completely encircle the body part of the user's body.

In Example 27, the subject matter of Example 26 optionally includes wherein the at least two arms extend outward from the center portion such that the main computing element is configured in a U-shape; wherein the main computing element is sized such that the body part of the user's body are receivable within a center portion of the U-shape.

In Example 28, the subject matter of any one or more of Examples 26-27 optionally include moving a slider element having a docking end within the arm between a retracted position within the arm and an extended position; wherein coupling the display element to the outer ends of the at least two arms comprises coupling the display element to the docking end.

In Example 29, the subject matter of Example 28 optionally includes wherein each slider element further comprises a pivot arm pivotably connected to the docking end of the slider; wherein coupling the display element to the outer ends of the at least two arms comprises coupling the display element to the pivot arm of the slider element.

In Example 30, the subject matter of Example 29 optionally includes pivoting the display element such that display element is oriented transverse to the plane defined by the main computing element.

In Example 31, the subject matter of any one or more of Examples 28-30 optionally include capturing an image with an action camera mounted to the pivot arm.

In Example 32, the subject matter of any one or more of Examples 28-31 optionally include coupling a slider end of at least one back strap to the slider element at the docking end; and coupling a center end of the at least one back strap to the center portion of the main computing element to form an arm loop.

In Example 33, the subject matter of Example 32 optionally includes coupling a second back strap to the slider element and the center portion of the main computing element to form a second arm loop.

In Example 34, the subject matter of any one or more of Examples 32-33 optionally include wherein the slider further comprises a slider bracket at the docking end of the slider; wherein the back strap further comprises a slider clip positioned at the slider end and configured to be coupled to the slider bracket.

In Example 35, the subject matter of any one or more of Examples 32-34 optionally include wherein the center portion of the main computing element further comprises a center bracket; wherein the back strap further comprises a center clip positioned at the center end and configured to be coupled to the center bracket.

In Example 36, the subject matter of any one or more of Examples 26-35 optionally include producing a sound with a speaker mounted to the pivot arm.

In Example 37, the subject matter of any one or more of Examples 26-36 optionally include coupling a first end of an angled head strap to a first side of the display element; coupling a second end of the angled head strap to a second side of the display element to form a head loop oriented generally angled to the plane of the main computing element.

In Example 38, the subject matter of Example 37 optionally includes wherein the first and second ends of the angled head strap are mounted to the opposing sides of the display element proximate to the outer ends of the arms of the main computing element.

In Example 39, the subject matter of any one or more of Examples 28-38 optionally include wherein the display element comprises a semi-transparent screen.

In Example 40, the subject matter of Example 39 optionally includes sliding the slider elements to move the display element relative to the center portion to resize a closed region within the plane between the center portion, the at least two arms, and the display element; wherein the closed region is sized to fit around a forehead of a user's forehead.

In Example 41, the subject matter of Example 40 optionally includes coupling the display element to the main computing element such that a bottom edge of the semi-transparent screen is aligned with a center horizontal axis of the user's vision.

In Example 42, the subject matter of any one or more of Examples 40-41 optionally include coupling the display element to the main computing element such that the semi-transparent screen is aligned is centered on a center horizontal axis of the user's vision.

In Example 43, the subject matter of any one or more of Examples 39-42 optionally include sliding the slider elements to move the display element relative to the center portion to resize a closed region within the plane between the center portion, the at least two arms, and the display element, wherein the closed region is sized to fit around a forehead of a user's neck; and coupling the display element to the main computing element such that a top edge of the semi-transparent screen is aligned with a center horizontal axis of the user's vision.

In Example 44, the subject matter of any one or more of Examples 39-43 optionally include mounting the display element to the main computing element proximate to one of a top edge and a bottom edge of the semi-transparent screen.

In Example 45, the subject matter of any one or more of Examples 39-44 optionally include applying a liquid repellant coating to the semi-transparent screen.

In Example 46, the subject matter of any one or more of Examples 39-45 optionally include projecting at least one image onto the semi-transparent screen.

In Example 47, the subject matter of Example 46 optionally includes mounting a display screen to the semi-transparent screen to project at least one image onto the semi-transparent screen.

In Example 48, the subject matter of any one or more of Examples 27-47 optionally include mounting the display screen to main computing element.

In Example 49, the subject matter of any one or more of Examples 47-48 optionally include positioning a face mask against a user's face.

In Example 50, the subject matter of Example 49 optionally includes wherein the face mask defines two eye holes.

Example 51 is an apparatus comprising means for performing any of the methods of Examples 26-50.

Example 52 is at least one machine-readable medium including instructions, which when executed by a machine, cause the machine to perform operations of any of the methods of Examples 26-50.

Example 53 is an apparatus for providing an image for a user with a wearable computing device, comprising: means for providing a main computing element having a center portion and at least two arms extending outward from the center portion within a plane such that the main computing element can partially encircle a body part of the user's body, wherein each arm has an outer end opposite the center portion; and means for coupling a display element to the outer ends of the at least two arms to completely encircle the body part of the user's body.

In Example 54, the subject matter of Example 53 optionally includes wherein the at least two arms extend outward from the center portion such that the main computing element is configured in a U-shape; wherein the main computing element is sized such that the body part of the user's body are receivable within a center portion of the U-shape.

In Example 55, the subject matter of any one or more of Examples 53-54 optionally include means for moving a slider element having a docking end within the arm between a retracted position within the arm and an extended position; wherein coupling the display element to the outer ends of the at least two arms comprises coupling the display element to the docking end.

In Example 56, the subject matter of Example 55 optionally includes wherein each slider element further comprises a pivot arm pivotably connected to the docking end of the slider; wherein coupling the display element to the outer ends of the at least two arms comprises coupling the display element to the pivot arm of the slider element.

In Example 57, the subject matter of Example 56 optionally includes means for pivoting the display element such that display element is oriented transverse to the plane defined by the main computing element.

In Example 58, the subject matter of any one or more of Examples 55-57 optionally include means for capturing an image with an action camera mounted to the pivot arm.

In Example 59, the subject matter of any one or more of Examples 55-58 optionally include means for coupling a slider end of at least one back strap to the slider element at the docking end; and means for coupling a center end of the at least one back strap to the center portion of the main computing element to form an arm loop.

In Example 60, the subject matter of Example 59 optionally includes means for coupling a second back strap to the slider element and the center portion of the main computing element to form a second arm loop.

In Example 61, the subject matter of any one or more of Examples 59-60 optionally include wherein the slider further comprises a slider bracket at the docking end of the slider; wherein the back strap further comprises a slider clip positioned at the slider end and configured to be coupled to the slider bracket.

In Example 62, the subject matter of any one or more of Examples 59-61 optionally include wherein the center portion of the main computing element further comprises a center bracket; wherein the back strap further comprises a center clip positioned at the center end and configured to be coupled to the center bracket.

In Example 63, the subject matter of any one or more of Examples 53-62 optionally include means for producing a sound with a speaker mounted to the pivot arm.

In Example 64, the subject matter of any one or more of Examples 53-63 optionally include means for coupling a first end of an angled head strap to a first side of the display element; means for coupling a second end of the angled head strap to a second side of the display element to form a head loop oriented generally angled to the plane of the main computing element.

In Example 65, the subject matter of Example 64 optionally includes wherein the first and second ends of the angled head strap are mounted to the opposing sides of the display element proximate to the outer ends of the arms of the main computing element.

In Example 66, the subject matter of any one or more of Examples 55-65 optionally include wherein the display element comprises a semi-transparent screen.

In Example 67, the subject matter of Example 66 optionally includes means for sliding the slider elements to move the display element relative to the center portion to resize a closed region within the plane between the center portion, the at least two arms, and the display element; wherein the closed region is sized to fit around a forehead of a user's forehead.

In Example 68, the subject matter of Example 67 optionally includes means for coupling the display element to the main computing element such that a bottom edge of the semi-transparent screen is aligned with a center horizontal axis of the user's vision.

In Example 69, the subject matter of any one or more of Examples 67-68 optionally include means for coupling the display element to the main computing element such that the semi-transparent screen is aligned is centered on a center horizontal axis of the user's vision.

In Example 70, the subject matter of any one or more of Examples 66-69 optionally include means for sliding the slider elements to move the display element relative to the center portion to resize a closed region within the plane between the center portion, the at least two arms, and the display element, wherein the closed region is sized to fit around a forehead of a user's neck; and means for coupling the display element to the main computing element such that a top edge of the semi-transparent screen is aligned with a center horizontal axis of the user's vision.

In Example 71, the subject matter of any one or more of Examples 66-70 optionally include means for mounting the display element to the main computing element proximate to one of a top edge and a bottom edge of the semi-transparent screen.

In Example 72, the subject matter of any one or more of Examples 66-71 optionally include means for applying a liquid repellant coating to the semi-transparent screen.

In Example 73, the subject matter of any one or more of Examples 66-72 optionally include means for projecting at least one image onto the semi-transparent screen.

In Example 74, the subject matter of Example 73 optionally includes means for mounting a display screen to the semi-transparent screen to project at least one image onto the semi-transparent screen.

In Example 75, the subject matter of Example 74 optionally includes means for mounting the display screen to main computing element.

In Example 76, the subject matter of any one or more of Examples 74-75 optionally include means for positioning a face mask against a user's face.

In Example 77, the subject matter of Example 76 optionally includes wherein the face mask defines two eye holes.

Example 78 is a wearable system, comprising: a main computing element having a center portion and at least two arms extending outward from the center portion within a plane, wherein each arm has an outer end opposite the center portion; and a display element operably connected to the outer ends of the at least two arms to enclose a closed region within the plane between the center portion, the at least two arms, and the display element.

In Example 79, the subject matter of Example 78 optionally includes wherein the at least two arms extend outward from the center portion such that the main computing element is configured in a U-shape.

In Example 80, the subject matter of any one or more of Examples 78-79 optionally include wherein each arm further comprises: a slider element having a docking end connectable to the display element; wherein the slider element is moveable between a retracted position within the arm and an extended position in which the slider element extends outward from the outer end of the arm to move the display element relative to the center portion.

In Example 81, the subject matter of Example 80 optionally includes wherein each slider element further comprises: a pivot arm pivotably connected to the docking end of the slider; wherein the display element is connectable to the pivot arm whereby pivoting the pivot arm on the slider arm pivots the display element relative to the plane defined by the main computing element.

In Example 82, the subject matter of Example 81 optionally includes wherein the display element is pivoted such that display element is oriented transverse to the plane defined by the main computing element.

In Example 83, the subject matter of any one or more of Examples 80-82 optionally include wherein the slider element further comprises: an action camera mountable to the pivot arm.

In Example 84, the subject matter of any one or more of Examples 80-83 optionally include at least one back strap having a slider end and a center end; wherein the slider end is attachable to the slider element at the docking end and the center end is attachable to the center portion of the main computing element to form an arm loop.

In Example 85, the subject matter of Example 84 optionally includes at least two back straps, each back strap extending from the center end to one of the at least two slider elements to form at least two arm loops.

In Example 86, the subject matter of any one or more of Examples 84-85 optionally include wherein the slider further comprises a slider bracket at the docking end of the slider; wherein the back strap further comprises a slider clip positioned at the slider end and configured to be coupled to the slider bracket.

In Example 87, the subject matter of any one or more of Examples 84-86 optionally include wherein the center portion of the main computing element further comprises a center bracket; wherein the back strap further comprises a center clip positioned at the center end and configured to be coupled to the center bracket.

In Example 88, the subject matter of any one or more of Examples 78-87 optionally include a speaker mountable to the pivot arm.

In Example 89, the subject matter of any one or more of Examples 78-88 optionally include an angled head strap having two ends, each end configured to be attach to opposing sides of the display element to form a head loop oriented generally angled to the plane of the main computing element.

In Example 90, the subject matter of Example 89 optionally includes wherein the ends of the angled head strap are mounted to the opposing sides of the display element proximate to the outer ends of the arms of the main computing element.

In Example 91, the subject matter of any one or more of Examples 78-90 optionally include wherein the display element comprises a semi-transparent screen.

In Example 92, the subject matter of Example 91 optionally includes wherein the closed region is sized to fit around a forehead of a user's forehead.

In Example 93, the subject matter of Example 92 optionally includes wherein the display element is coupled to the main computing element such that a bottom edge of the semi-transparent screen is aligned with a center horizontal axis of the user's vision; wherein the instructions for controlling operation of the wearable system comprises instructions for: projecting at least one image onto the semi-transparent screen such that the at least one image is viewable in a upper portion of the user's vision.

In Example 94, the subject matter of any one or more of Examples 92-93 optionally include wherein the display element is coupled to the main computing element such that the semi-transparent screen is centered on a center horizontal axis of the user's vision; wherein the instructions for controlling operation of the wearable system comprises instructions for: projecting at least one image onto the semi-transparent screen such that the at least one image is positioned in the center of the user's vision.

In Example 95, the subject matter of any one or more of Examples 91-94 optionally include wherein the closed region is sized to fit around a user's neck; wherein the display element is coupled to the main computing element such that a top edge of the semi-transparent screen is aligned with a center horizontal axis of the user's vision; wherein the instructions for controlling operation of the wearable system comprises instructions for: projecting at least one image onto the semi-transparent screen such that the at least one image is viewable in a lower portion of the user's vision.

In Example 96, the subject matter of any one or more of Examples 91-95 optionally include wherein the display element is mounted to the main computing element proximate to one of a top edge of the semi-transparent screen.

In Example 97, the subject matter of any one or more of Examples 91-96 optionally include wherein the semi-transparent screen comprises a liquid repellant coating.

In Example 98, the subject matter of any one or more of Examples 91-97 optionally include wherein the instructions for controlling operation of the wearable system comprises instructions for: projecting at least one image onto the semi-transparent screen.

In Example 99, the subject matter of Example 98 optionally includes wherein a display screen is mounted to the semi-transparent screen for projection of the at least one image onto the semi-transparent screen; wherein the instructions for controlling operation of the wearable system comprises instructions for: projecting at least one image onto the semi-transparent screen with the display screen.

In Example 100, the subject matter of Example 99 optionally includes wherein the display screen interchangeably mounted to the main computing element; wherein the instructions for controlling operation of the wearable system comprises instructions for: projecting at least one image onto at least one of the semi-transparent screen or the display screen.

In Example 101, the subject matter of any one or more of Examples 99-100 optionally include wherein the semi-transparent screen further comprises a face mask positionable against a user's face.

In Example 102, the subject matter of Example 101 optionally includes wherein the face mask defines two eye holes.

Each of these non-limiting examples may stand on its own, or may be combined in any permutation or combination with any one or more of the other examples.

The above detailed description includes references to the accompanying drawings, which form a part of the detailed description. The drawings show, by way of illustration, specific embodiments in which the present subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example or one or more aspects thereof), or with respect to other examples one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the present subject matter should be determined with reference to the appended claims, along with the full scope of equivalents to which such claims are entitled.

What is claimed is:

1. A wearable computing device, comprising:
    a main computing element having a center portion and at least two arms extending outward from the main computing element within a plane, wherein each arm has an outer end opposite the center portion; and
    a display element operably connected to the outer ends of the at least two arms to enclose a closed region within the plane between the center portion, the at least two arms, and the display, element, wherein the display element has a first orientation and a second orientation, the first orientation where the device is supported by a head of a user and the second orientation where the device is supported by a neck of the user; and
    at least one back strap having a slider end and a center end,
    wherein the slider end is attachable to a slider element and the center end is attachable to the center portion of the main computing element to form an arm loop,
    wherein the arm loop is configured to extend from the center portion and
        underneath an arm of the user to the slider element to secure the main computing element to a torso of the user.

2. The wearable computing device of claim 1, wherein the at least two arms extend outward from the center portion such that the main computing element is configured in a U-shape.

3. The wearable computing device of claim 1, wherein
    the slider element has a docking end connectable to the display element; and
    wherein the slider element is moveable between a retracted position within each arm and an extended position in which the slider element extends outward from the outer end of a respective arm to move the display element relative to the center portion.

4. The wearable computing device of claim 3, wherein each slider element further comprises:
    a pivot arm pivotably connected to the docking end of the slider element;
    wherein the display element is connectable to the pivot arm whereby pivoting the pivot arm on the slider arm pivots the display element relative to the plane defined by the main computing element.

5. The wearable computing device of claim 4, wherein the display element is pivoted such that display element is oriented transverse to the plane defined by the main computing element.

6. The wearable computing device of claim 3, wherein the slider element further comprises:
    an action camera mountable to the pivot arm.

7. The wearable computing device of claim 3, comprising at least two back straps, each back strap extending from the center end to the slider element to form at least two arm loops.

8. The wearable computing device of claim 3, wherein the at least one slider element further comprises a slider bracket at the docking end of the slider element;
    wherein the at least one back strap further comprises a slider clip positioned at the slider end and configured to be coupled to the slider bracket.

9. The wearable computing device of claim 1, wherein the center portion of the main computing element further comprises a center bracket;
    wherein the at least one back strap further comprises a center clip positioned at the center end and configured to be coupled to the center bracket.

10. The wearable computing device of claim 1, further comprising:
    a speaker mountable to the pivot arm.

11. The wearable computing device of claim 1, further comprising:

an angled head strap having two ends, each end configured to be attached to opposing sides of the display element to form a head loop oriented generally angled to the plane of the main computing element.

12. The wearable computing device of claim 11, wherein the ends of the angled head strap are mounted to the opposing sides of the display element proximate to the outer ends of the arms of the main computing element.

13. The wearable computing device of claim 1, wherein the display element comprises a semi-transparent screen.

14. The wearable computing device of claim 13, wherein the closed region is sized to fit around a forehead of the user.

15. The wearable computing device of claim 14, wherein the display element is coupled to the main computing element such that a bottom edge of the semi-transparent screen is aligned with a center horizontal axis of the user's vision.

16. The wearable computing device of claim 14, wherein the display element is coupled to the main computing element such that the semi-transparent screen is centered on a center horizontal axis of the user's vision.

17. The wearable computing device of claim 13, wherein the closed region is sized to fit around a user's neck; wherein the display element is coupled to the main computing element such that a top edge of the semi-transparent screen is aligned with a center horizontal axis of the user's vision.

18. The wearable computing device of claim 13, wherein the display element is mounted to the main computing element proximate to one of a top edge and a bottom edge of the semi-transparent screen.

19. The wearable computing device of claim 13, wherein at least one image is projected onto the semi-transparent screen.

20. The wearable computing device of claim 19, wherein a display screen is mounted to the semi-transparent screen for projection of the at least one image onto the semi-transparent screen.

21. The wearable computing device of claim 20, wherein the display screen is interchangeably mounted to the main computing element with the semi-transparent screen.

22. The wearable computing device of claim 20, wherein the display screen further comprises a face mask positionable against a user's face.

23. The wearable computing device of claim 13, wherein the semi-transparent screen comprises a liquid repellant coating.

24. The wearable computing device of claim 22, wherein the face mask defines two eye holes.

* * * * *